United States Patent
Leao et al.

(10) Patent No.: US 11,440,536 B2
(45) Date of Patent: Sep. 13, 2022

(54) WIRELESS DEVICE FOR DISABLING A DIFFERENTIAL IN AN ALL WHEEL DRIVE VEHICLE

(71) Applicant: USP Motorsports Inc, Pompano Beach, FL (US)

(72) Inventors: Jonathan Leao, Coconut Creek, FL (US); Christopher Green, Lighthouse Point, FL (US)

(73) Assignee: USP Motorsports Inc, Pompano Beach, FL (US)

( * ) Notice: Subject to any disclaimer, the term of this patent is extended or adjusted under 35 U.S.C. 154(b) by 27 days.

(21) Appl. No.: 16/944,143

(22) Filed: Jul. 30, 2020

(65) Prior Publication Data

US 2021/0031751 A1 Feb. 4, 2021

Related U.S. Application Data

(60) Provisional application No. 62/880,080, filed on Jul. 30, 2019.

(51) Int. Cl.
| | |
|---|---|
| *B60W 10/06* | (2006.01) |
| *B60W 10/12* | (2012.01) |
| *B60W 30/02* | (2012.01) |
| *B60W 50/08* | (2020.01) |
| *B60R 16/023* | (2006.01) |
| *B60W 30/00* | (2006.01) |
| *B60R 16/02* | (2006.01) |

(52) U.S. Cl.
CPC ........... *B60W 30/02* (2013.01); *B60R 16/023* (2013.01); *B60R 16/0207* (2013.01); *B60W 10/06* (2013.01); *B60W 10/12* (2013.01); *B60W 30/00* (2013.01); *B60W 50/082* (2013.01)

(58) Field of Classification Search
CPC ...... B60W 10/06; B60W 10/12; B60W 10/14; B60W 10/119; B60W 30/00; B60W 30/02; B60W 50/082; B60W 2540/215; B60W 2710/12; B60W 2720/403; B60R 16/0207; B60R 16/023
See application file for complete search history.

(56) References Cited

U.S. PATENT DOCUMENTS

| | | | | |
|---|---|---|---|---|
| 6,085,138 | A * | 7/2000 | Smith | B60K 23/08 172/3 |
| 2012/0077633 | A1* | 3/2012 | Mueller | B60W 10/115 475/5 |
| 2019/0202440 | A1* | 7/2019 | Watanabe | B60W 10/119 |

FOREIGN PATENT DOCUMENTS

| | | | | |
|---|---|---|---|---|
| CA | 2739935 A1 * | 4/2010 | ............. | B61C 17/00 |
| WO | WO-2007072170 A3 * | 11/2007 | ............. | B60K 23/04 |

* cited by examiner

*Primary Examiner* — Edwin A Young
(74) *Attorney, Agent, or Firm* — Pearson IP; Loren Donald Pearson

(57) ABSTRACT

For use in all wheel drive vehicles with a rear electronic differential, a device containing a switch for making and breaking an electrical connection in a ground line of a differential harness. When the circuit is broken and the rear electronic differential is not powered, the rear electronic differential does not power the rear axles. A wireless remote control has buttons that when pressed send a wireless signal to a receiver connected to the switch. When the first button in the remote control is pressed, the switch breaks the connection in the ground line. When the second button in the remote control is pressed, the switch completes the connection in the ground line.

11 Claims, 5 Drawing Sheets

WIRELESS DEVICE FOR DISABLING A DIFFERENTIAL IN AN ALL WHEEL DRIVE VEHICLE

CROSS-REFERENCE TO RELATED APPLICATIONS

This application claims the benefit of U.S. Provisional Application No. 62/880,080, filed Jul. 30, 2019.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to differentials in all wheel drive cars.

Description of the Related Art

All Wheel Drive is also referred to as AWD. AWD describes vehicles with drive train systems that have permanent drive, a differential between the front and rear drive shafts, and active management of torque transfer.

A differential is a gear train with three shafts that has the property that the rotational speed of one shaft is the average of the speeds of the others, or a fixed multiple of that average.

Automobiles sold under the trademark AUDI® include a popular AWD system sold under the trademark QUATTRO®. In such systems, the engine and transmission are situated in a longitudinal position. Torque is sent through the transmission to a mechanical center differential, which apportions (distributes) the torque between front and rear driven axles.

Many AWD vehicles (for example, the AWD vehicles made by AUDI®, VOLKSWAGEN®, FORD®, and VOLVO®) utilize an electronic differential (ED). In automotive engineering the electronic differential is a form of differential, which provides the required torque for each driving wheel and allows different wheel speeds. The electronic differential is used in place of the mechanical differential in multi-drive systems. A bus interconnects an Engine Control Module (ECM) and the Electronic Differential (ED). The bus includes a ground line plus additional lines (typically, three to six wires) for carrying signals between the ECM and the ED. When cornering, the inner and outer wheels rotate at different speeds, because the inner wheels describe a smaller turning radius. The electronic differential uses the steering wheel command signal and the motor speed signals from the ECM to control the power to each wheel so that all wheels are supplied with the torque they need.

All wheel drive cars pose challenges that two-wheel drive cars do not face. First, the driving of four wheels is less fuel efficient than two-wheel drive counterparts. Second, all wheel drive vehicles cannot be tested on a dynamo that is configured only to work with two-wheel-drive vehicles.

All wheel drive cars are used in drag racing. Before starting a drag race, drivers perform a pre-race burn out to clean and heat up their tires to improve traction. All wheel drive vehicles are not able to perform burn outs because the engine's power is distributed amongst the four tires.

FIG. 1 shows a powertrain of an all wheel drive vehicle according to the prior art. The powertrain includes a driveshaft 1. A rear electronic differential 2 is connected to the driveshaft 1. A manual shifter 3 is connected to the driveshaft 1. An engine 4 is connected to the driveshaft 1 via a front differential 5.

BRIEF SUMMARY OF THE INVENTION

The invention encompasses a wireless device for disabling one (electronic) differential in an all-wheel drive (AWD) vehicle. The device is intended for quick installation and wireless control with a remote. When the driver of a vehicle wants to disable a differential, the driver touches a button on a remote control. The same button is touched when re-enabling the differential to return to AWD functionality.

The invention includes a circuit box containing a radio frequency receiver, a pass-through circuit, a switch, power, and two connector ports.

The device is connected in-line with the bus of the electronic differential (ED). The bus interconnects the ED and the Engine Control Module (ECM). The bus includes at least one line for carrying signals between the ED and ECM. The bus includes a ground line. Communications signals that are sent over the bus are passed-through the device. In some instances, the bus includes a power line. In such instances, the power from the power line can be used to power the receiver.

The device includes a switch that disconnects the ground line in the bus. Without power, the ED is deactivated and the rear differential acts like a differential in a front wheel drive vehicle. The other power signal is connected to the output port connector via the switch.

The device includes a button that when pressed signals the switch to disconnect the ground. Either the same button or a second button is connected to device, that when pressed causes the switch to reconnect the ground and, thereby, reactivate the ED.

The button of the device can be placed in a remote control. The remote control includes a wireless transmitter for sending a signal to a wireless receiver connected to the microntroller of the device. In such a case the connection between the remote control and the receiver can be made by a wireless signal.

A remote control paired with the receiver is used to control the switch of the device. When the driver wants the vehicle to operate in two wheel drive mode, the driver actuates a remote control button is actuated to open the switch in the device and remove power from the electronic differential, thereby disengaging it from the drive shaft and transmission.

When the driver desires all-wheel drive, another button on the remote control closes the switch restoring power to the differential, thereby reenabling the differential.

Although the invention is illustrated and described herein as embodied in a wireless device for disabling a differential in an all wheel drive vehicle, the invention is not limited to

DETAILED DESCRIPTION OF THE INVENTION

Figure 1:
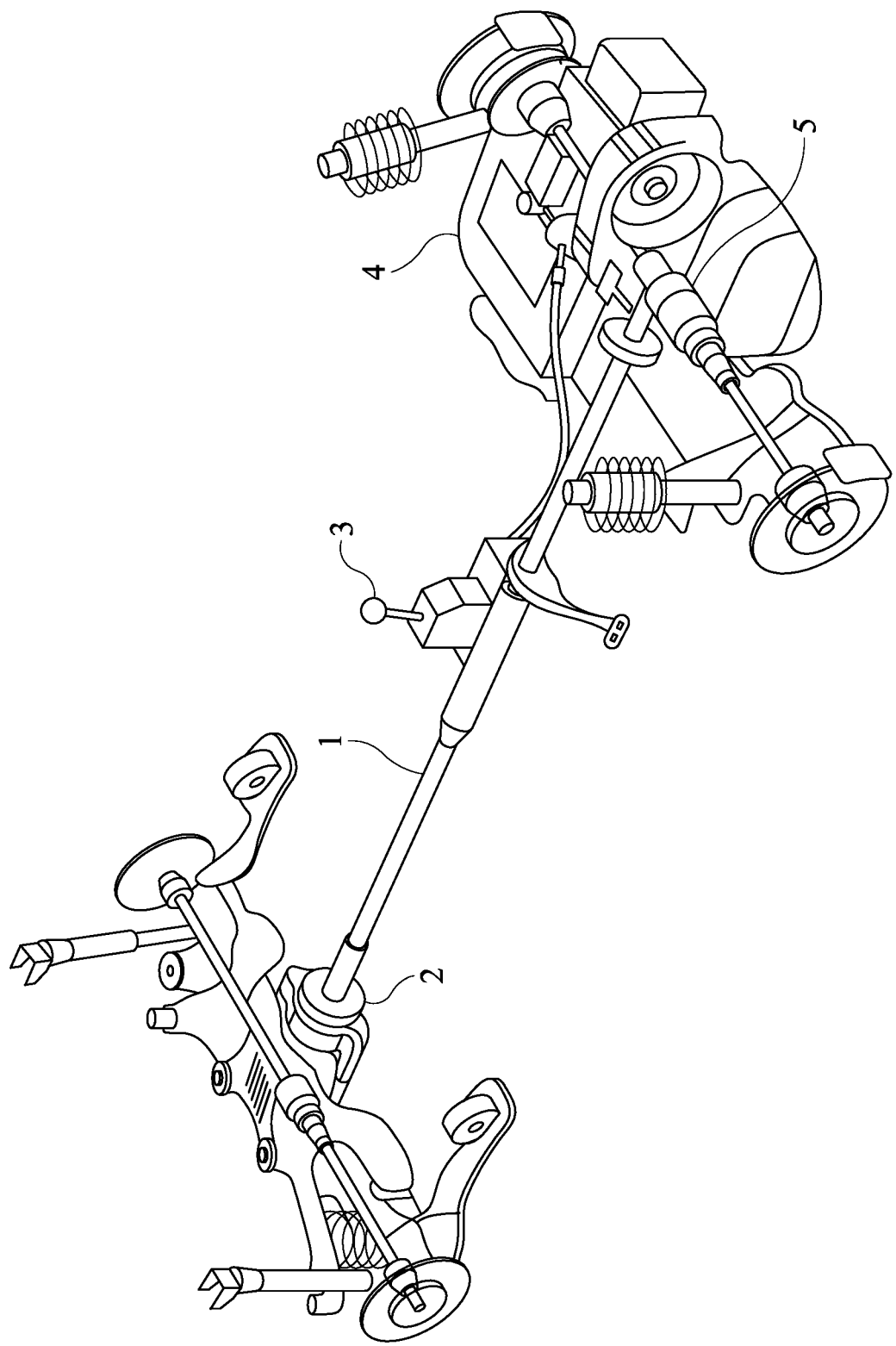
FIG. 1 is a front right top perspective view of a powertrain of an all-wheel drive according to the prior art.

The sole embodiment of the invention is described below and is shown in FIGS. 2-7 of the drawing.

Figure 2:
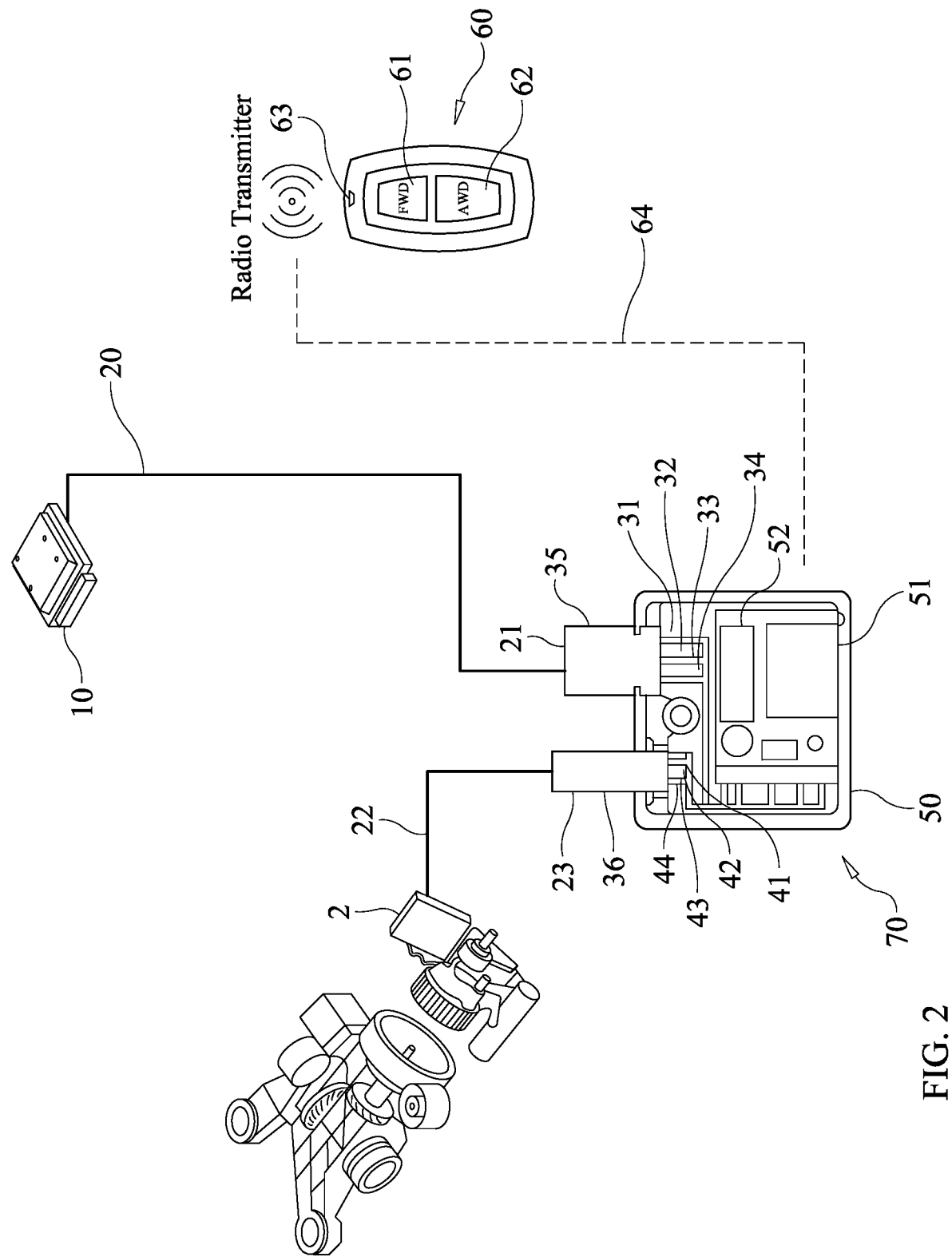
FIG. 2 is a partial diagrammatic and partial schematic view of a device according to the invention.
Figure 3:
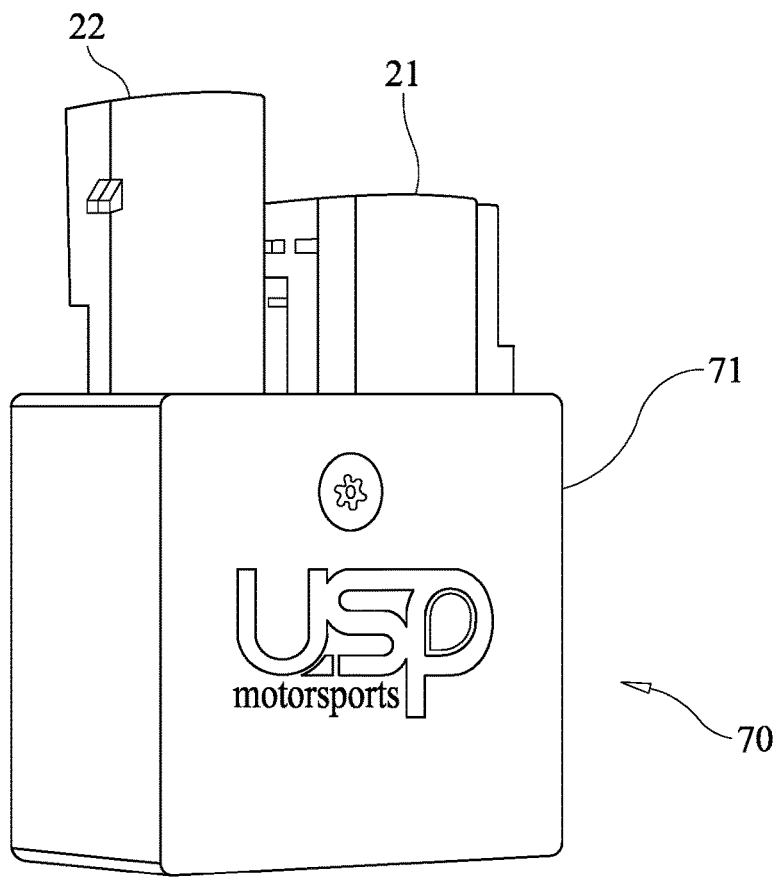
FIG. 3 is a front left perspective view of the device shown in FIG. 2.
Figure 4:
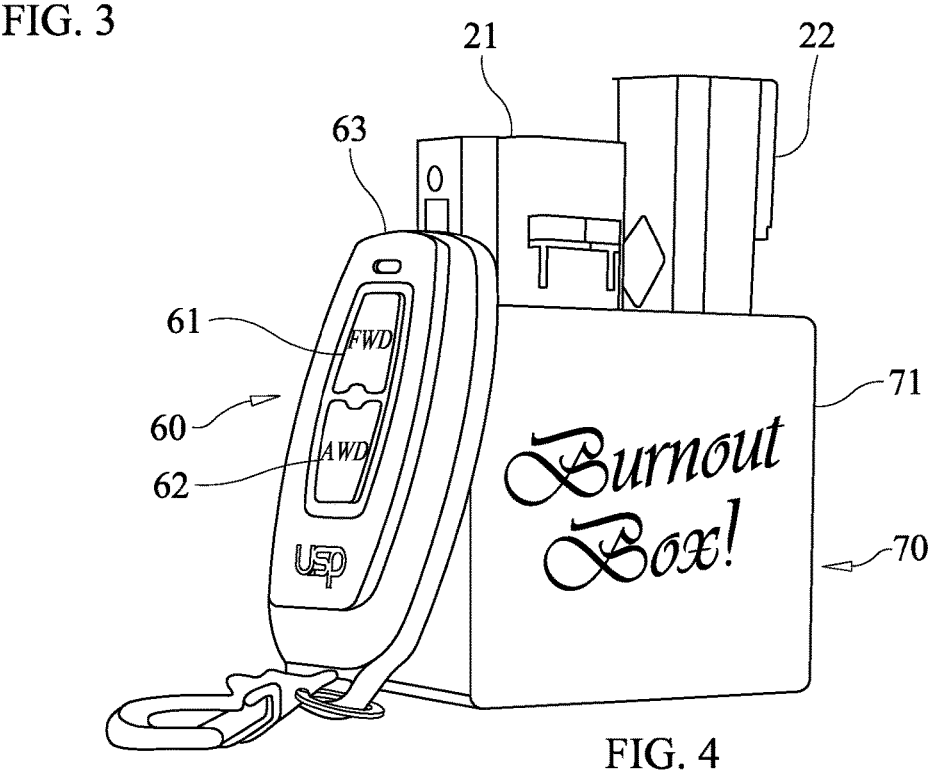
FIG. 4 is a bottom rear right perspective view of the device shown in FIG. 3 and remote control.
Figure 5:
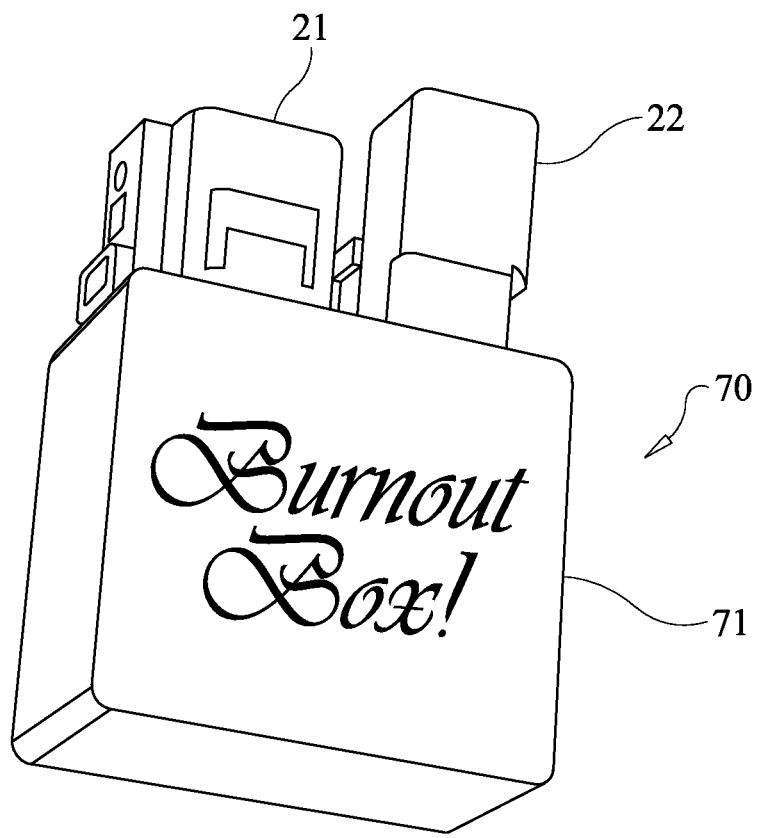
FIG. 5 is a bottom rear left perspective view of the device shown in FIG. 3.
Figure 6:
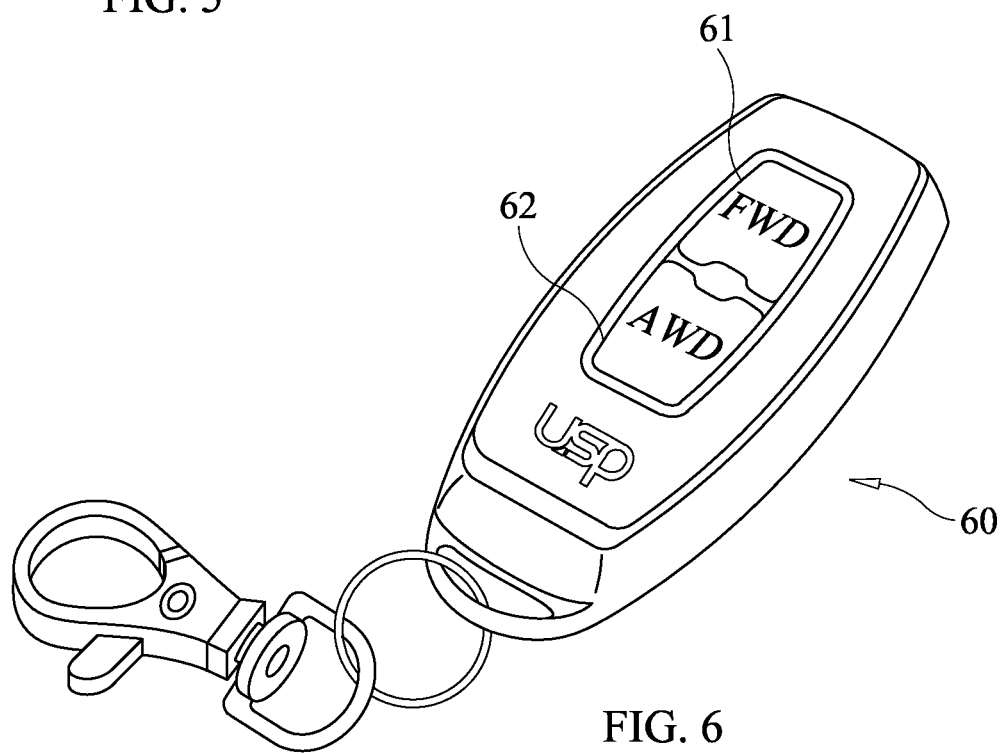
FIG. 6 is a perspective view of the remote control shown in FIG. 4.
Figure 7:
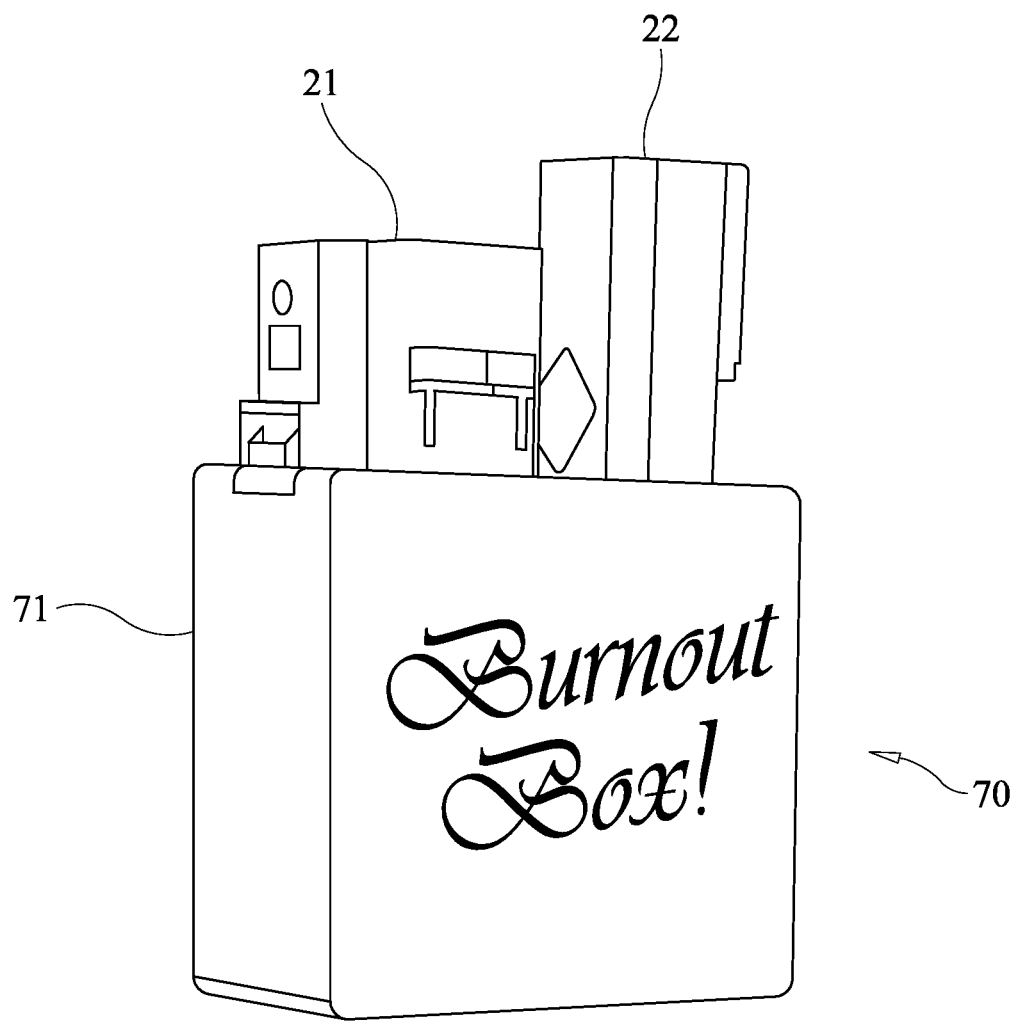
FIG. 7 is a rear left perspective view of the device shown in FIG. 3.

FIG. 2 shows a device 70 with a differential plug 36 and an Engine Control Unit (ECU) plug 35. An OEM differential harness is formed by a first differential segment 20 and a second differential segment 22. A female D-connector part 21 that was connected to a male D-connector part 23 is separated. The female D-connector part 21 plugs into the Engine Control Unit (ECU) plug 35. The male D-connector part 23 plugs into the differential plug 36.

The device 70 includes a circuit box 71. The circuit box 72 houses a system board 50. The system board 50 is connected to a radio frequency receiver 51. A microcontroller 52 is connected to the system board 50. Leads 31, 32, 33, and 34 run from the ECU plug 35 to the system board 50. Leads 41, 42, 43, and 44 run from the differential plug 36 to the system board 50. Leads 31 and 41 are tied to ground. Leads 32 and 42 carry power. Leads 33, 34, 43, and 44 carry signals from the ECU 10 to the rear electronic differential 2. The system board includes a switch that connects and disconnects the ground leads 31 and 41.

The device 70 is connected in-line with the differential harness 20 and 22. Communications signals are passed-through the device 70, one of the power signals is passed through and also used to power the receiver 5 and switch in the device 70.

A remote control 60 paired with the receiver 51 is used to control the switch. When the driver wants the vehicle to operate in two wheel driver mode, the driver presses a remote control button 61 to open the switch and to break the connection in the ground line of the differential harness. As a result of being unpowered, the rear electronic differential 2 disengages from the drive shaft 1.

When the driver desire all-wheel drive, the driver presses another button 62 on the remote control 60. When the button 62 is pressed, the remote control 60 sends a signal from the transmitter 63 to the receiver 51. The signal is relayed to the microcontroller 52, which closes the switch, completes the circuit, and restores power to the rear electronic differential 2 thereby reenabling the rear electronic differential 2.

FIGS. 3-7 show various views of the device 70 and the remote control. The device has a circuit box 71 housing made of acetal homopolymer such as those sold under the tradename DELRIN®. The Female D-connector part 21 and the male D-connector part 23 extend from the circuit box 71.

The remote control 60 has an on button 61, an off button 62, and a wireless transmitter 63. The on button 61 and the off button 62 are connected to the wireless transmitter 63. When the on button 61 is pressed, the wireless transmitter 63 transmits a signal to the receiver 51, which causes the switch to break the circuit in the ground line. When the off button 622 is pressed, the wireless transmitter 63 transmits a signal to the receiver 52, which causes the switch to reform the circuit in the ground line.

Unless otherwise mentioned the reference numbers are used consistently throughout the figures.

What is claimed is:

1. A device for disabling a rear electric differential of an all wheel drive vehicle, comprising:
    a first socket for connecting to a first connector part of a first differential harness segment of a differential harness;
    a second socket for connecting to a second connector part of a second differential harness segment of the differential harness;
    a first lead being connected to said first socket, said first lead being configured to form an electrical connection with a ground line of the first differential harness segment;
    a second lead being connected to said second socket, said second lead being configured to form an electrical connection with a ground line of the second differential harness segment; and
    a switch creating and disrupting an electrical connection between said first lead and said second lead.

2. The device according to claim 1, further comprising a controller having a button for deactivating the rear electric differential, said controller sending a signal to said switch, said switch disrupting the electrical connection when activated.

3. The device according to claim 2, wherein:
    a wireless receiver is connected to said switch;
    said controller includes a wireless transmitter, said wireless transmitter sending the signal to said wireless receiver when said button is pressed.

4. The device according to claim 1, wherein:
    said first socket is configured to form lockingly engage with a first portion of a D-Plug connector; and
    said second socket is configured to form lockingly engage with a second portion of the D-Plug connector.

5. The device according to claim 1, further comprising:
    a third lead being connected to said first socket, said third lead being configured to form an electrical connection with a power line of the first differential harness segment;
    a fourth lead being connected to said second socket, said fourth lead being configured to form an electrical connection with a power line of the second differential harness segment; and
    said third lead and said fourth lead being connected to said switch and providing power to operate said switch.

6. A device for disabling a rear electric differential in an all wheel drive vehicle, comprising:

a rear electric differential for turning rear axles of the vehicle;

an engine control module for controlling an engine of the vehicle;

a differential harness interconnecting said rear electric differential and said engine control module, said differential harness including a ground wire completing a circuit between said rear electric differential and said engine control module; and a switch for completing and disrupting said circuit between said rear electric differential and said engine control module, said switch interconnecting a first differential harness segment of said differential harness and a second differential harness segment of said differential harness.

7. The device according to claim 6, further comprising a controller having a button for deactivating the rear electric differential, said controller sending a signal to said switch, said switch disrupting the circuit when activated.

8. The device according to claim 7, wherein:
a wireless receiver is connected to said switch;
said controller includes a wireless transmitter, said wireless transmitter sending the signal to said wireless receiver when said button is pressed.

9. In an all wheel drive vehicle without a means for disabling a rear electric differential, a device for disabling the rear electric differential, said device comprising:

a rear electric differential for turning rear axles of the vehicle;

an engine control module for controlling an engine of the vehicle;

a differential harness interconnecting said rear electric differential and said engine control module, said differential harness including a ground wire completing a circuit between said rear electric differential and said engine control module; and a switch for completing and disrupting said circuit between said rear electric differential and said engine control module, said switch interconnecting a first differential harness segment of said differential harness and a second differential harness segment of said differential harness.

10. The device according to claim 9, further comprising a controller having a button for deactivating the rear electric differential, said controller sending a signal to said switch, said switch disrupting the circuit when activated.

11. The device according to claim 10, wherein:
a wireless receiver is connected to said switch;
said controller includes a wireless transmitter, said wireless transmitter sending the signal to said wireless receiver when said button is pressed.

\* \* \* \* \*